(12) United States Patent
Ledoux

(10) Patent No.: US 10,106,470 B2
(45) Date of Patent: Oct. 23, 2018

(54) METHOD FOR INCORPORATING MICRONUTRIENTS IN THE OUTER SHELL OF UREA-BASED PARTICLES

(71) Applicant: YARA INTERNATIONAL ASA, Oslo (NO)

(72) Inventor: Francois Ledoux, Cormeilles en Parisis (FR)

(73) Assignee: YARA INTERNATIONAL ASA, Oslo (NO)

( * ) Notice: Subject to any disclaimer, the term of this patent is extended or adjusted under 35 U.S.C. 154(b) by 97 days.

(21) Appl. No.: 15/122,760

(22) PCT Filed: Mar. 3, 2015

(86) PCT No.: PCT/EP2015/054416
§ 371 (c)(1),
(2) Date: Aug. 31, 2016

(87) PCT Pub. No.: WO2015/132258
PCT Pub. Date: Sep. 11, 2015

(65) Prior Publication Data
US 2017/0066693 A1 Mar. 9, 2017

(30) Foreign Application Priority Data
Mar. 3, 2014 (NO) .................................. 20140272

(51) Int. Cl.
C05C 9/00 (2006.01)
C05G 3/00 (2006.01)
C05D 9/02 (2006.01)

(52) U.S. Cl.
CPC .............. C05C 9/005 (2013.01); C05D 9/02 (2013.01); C05G 3/0041 (2013.01)

(58) Field of Classification Search
CPC .......... C05C 9/00; C05C 9/005; C05G 3/0041
See application file for complete search history.

(56) References Cited

U.S. PATENT DOCUMENTS

| 3,392,007 A | 7/1968 | Christoffel et al. |
| 3,419,379 A | 12/1968 | Goodale et al. |
| 6,030,659 A | 2/2000 | Whitehurst et al. |
| 9,284,232 B2 * | 3/2016 | Ledoux ................. C05C 1/00 |
| 2004/0237615 A1 * | 12/2004 | Green ................. A01C 1/06 71/28 |
| 2010/0031719 A1 * | 2/2010 | Hero ................. C05C 1/02 71/30 |

FOREIGN PATENT DOCUMENTS

| FR | 2 686 861 | 8/1993 |
| JP | 2002-316888 | 10/2002 |
| NZ | 286023 | 12/1996 |
| WO | 93/10062 | 5/1993 |
| WO | 99/15480 | 4/1999 |
| WO | 2012/064730 | 5/2012 |
| WO | 2014/033160 | 3/2014 |

OTHER PUBLICATIONS

International Search Report and Written Opinion dated May 19, 2015 in International (PCT) Application No. PCT/EP2015/054416.
International Preliminary Report on Patentability dated Apr. 8, 2016 in International (PCT) Application No. PCT/EP2015/054416.
Reply to Written Opinion dated Dec. 29, 2015 in International (PCT) Application No. PCT/EP2015/054416.

* cited by examiner

Primary Examiner — Wayne A Langel
(74) Attorney, Agent, or Firm — Wenderoth, Lind & Ponack, L.L.P.

(57) ABSTRACT

The invention concerns a method for incorporating micronutrients in an outer shell of urea-based particles, characterized in that it comprises the steps of a) applying a liquid concentrated mineral acid with a water content of at most 25 weight % to urea-based particles having a water content of at most 2 weight %, in order to at least form a double salt layer at the outer surface of the urea-based particles such that an acidified particle grasping layer is obtained, and subsequently b) applying a solid mineral base in powder form to the urea-based particles of step a) in order to react with the grasping layer of the urea-based particles; wherein the mineral acid or the solid mineral base are the source of any one of the micronutrients and wherein the liquid concentrated mineral acid and the solid mineral base in powder form are applied in a non-equimolar ratio between 0.1 and 1 mol/mol mineral acid/mineral base. The invention furthermore concerns a particulate urea-based fertilizer, comprising urea-based particles with a water content of at most 2 weight %, comprising micronutrients in an outer shell, the urea-based particles being obtained by a method according to the invention.

17 Claims, No Drawings

METHOD FOR INCORPORATING MICRONUTRIENTS IN THE OUTER SHELL OF UREA-BASED PARTICLES

FIELD OF THE INVENTION

The invention relates to a method for incorporating micronutrients into the outer shell of urea-based particles, in particular to urea-based particles for use as a fertilizer.

The invention further relates to a particulate urea-based fertilizer, comprising the urea-based particles, e.g. prills and/or granules, having micronutrients in the outer shell.

BACKGROUND

Urea is today the main nitrogenous fertilizer used worldwide. Urea that is chemically pure has a nitrogen content of 46.6% N (expressed as N). Urea that is commonly available and used as fertilizer is usually very pure and typically has a nitrogen content of 46% N. Urea is therefore the fertilizer with the highest concentration of nitrogen, one of the reasons of its popularity.

Urea can be applied as such for straight nitrogenous fertilization, or in combinations with other elements, such as for example NS grades in which nitrogen and sulphur sources are combined, NP (respectively NK) grades in which nitrogen and phosphate (respectively potash) sources are combined, NPK combining the three major nutrients required by the crops, etc.

These different elements can be combined with urea as a physical blend of different products, or products being mixed/processed together into homogeneous granules by e.g. granulation, compaction, etc. Some examples of urea-based products:

NS products such as UAS which are mixtures of urea and ammonium sulphate, for example with a N content of 40% N, NPK triple 19 expressed in $N/P_2O_5/K_2O$, which are combinations of urea, DAP (di-ammonium phosphate) and muriate of potash (MOP), etc.

Urea and urea-based compounds are often blended with other fertilizers in order to adjust the formula and thus supply a balanced nutrition with the different elements required for the plant growth. The main advantages of blending are of course that from a limited amount of available products, it is possible to produce virtually an infinite amount of grades adjusted to the requirement, in a very flexible way.

However, blending of urea and of urea-based compounds is sometimes difficult or even impossible, due to products chemical incompatibility. Reference is made to the well documented and explicit "Guidance for the compatibility of fertilizer blending materials" published by EFMA in June 2006.

In particular, urea and urea-based compounds used as fertilizer, are well known to be not blendable with ammonium nitrate and ammonium nitrate based product (CAN, NPK, etc.), as well as with superphosphates (single superphosphate SSP, triple superphosphate TSP, etc.). Urea and urea-based compounds are also known to be difficult to blend with calcium nitrate.

These blending incompatibilities or limitations have different causes.

When blending urea-based products together with ammonium nitrate based compounds, the mixture will quickly become wet and absorbs moisture from the surrounding atmosphere, turning the free flowing granules into a wet mud. Even if moisture absorption from the surrounding atmosphere is prevented, the blend will turn wet from its own water content present from the beginning. The reason is that urea and ammonium nitrate form a double salt that is especially hygroscopic. As soon as urea and ammonium nitrate are in contact, this double salt is forming and starts turning liquid. Being more hygroscopic than the initial constituents, it will attract the moisture from the rest of the blend. The formed liquid phase will dissolve the products in contact, thus forming more UAN double salts and enhance the phenomenon that will propagate further.

The incompatibility effect with for example superphosphates and calcium nitrate is different. Many salts contain some water of crystallization, such as superphosphates and calcium nitrate. In presence of such salts, urea has the general tendency to form double salts, thus releasing the water of crystallization. Therefore mixtures of urea and urea-based compounds with SSP/TSP and with calcium nitrate will also have the tendency to turn muddy, independently from moisture pick up from the surrounding.

If these products are very dry, then they have the possibility to bind some of the water that would be released from the forming double salts with urea, making the blend still feasible. This is the reason why in the pre-mentioned blending guidance of EFMA, the remark about calcium nitrate and urea is made: the compatibility is limited, moisture pick up must be absolutely avoided, therefore quote: "consider the relative humidity during blending".

It is important to notice that blending UAS with calcium nitrate is much more an issue, due to the formation of UAN (urea ammonium nitrate) and subsequent liquid phase formation. Indeed, ammonium sulphate from UAS can react with calcium nitrate to form ammonium nitrate and calcium sulphate, and ammonium nitrate forms the very hygroscopic UAN double salt with urea as described here above.

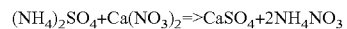

$(NH_4)_2SO_4+Ca(NO_3)_2=>CaSO_4+2NH_4NO_3$

In the past, there has been development of a technique allowing blending urea with e.g. TSP. This was based on a sulphur coating of one or both components. Typically urea is coated with about 20% of molten sulphur, in order to create a strong barrier isolating the urea from the superphosphate.

The opposite approach was possible, i.e. to produce sulphur-coated TSP in order to make it blendable with urea. Such an approach suffers significant drawbacks, that the present invention overcomes. First of all such a layer of sulphur, if well tight, creates a delayed release effect since sulphur is insoluble in water. It means that one compound, either urea or TSP depending on which one has been sulphur-coated, will have some delayed release effect which is not necessarily the aim. Moreover, the sulphur shell will remain for very long in the field, having virtually no positive effect for the fertilization. In order to get a proper sulphur-coating, typically 20% of sulphur needs to be applied. If less, the coating is not thick enough and will be imperfect, leading to degradation over time of the blend. This coating act then as a diluent of the fertilizer without bringing extra fertilization value. Moreover, sulphur is incompatible with ammonium nitrate, therefore such sulphur coating technique is anyway not applicable to ammonium nitrate containing blends.

Based on the same principle of an insoluble coating, one can mention the possibilities of blending some polymer-coated urea with e.g. ammonium nitrate. Such polymer-coated urea product is available for example in the North American market, see for example coatings as described in International patent application WO2012/064730. It is produced to get a slow release effect of nitrogen urea. Thanks to this slow release coating, it can be blended with most other products, but by nature its nitrogen will be released with delay compared to the other nutrients. Moreover, such a polymer coating has in itself no fertilizing value and dilutes by several percent the nitrogen content of urea.

PRIOR ART

FR 2 686 861 A (Thüring, 1993) describes a coating procedure which substitutes the traditional coating with sealing of the particulated fertilizers by a solid capsule. It provides the fertilizers with a better protection and prevents it more efficiently from caking than a traditional coating does. The coating procedure is carried out by spraying the particulated fertilizers with a first reagent in the form of a solid mineral base, such as magnesium oxide, calcium oxide or barium oxide, followed by an aqueous solution of a second reagent, such as phosphoric, sulphuric, nitric or citric acid which reacts with the first reagent to form a solid capsule of a metal salt. According to this patent document, the contact between the acid and the granule is avoided to prevent the acid to form a slurry with the granule. Such a coating would not adhere sufficiently to the fertilizer core and would not be suitable in blends.

JP 2002-316888 A (Sumitomo Chemical CO Ltd) discloses a similar method and product wherein a granular product is first coated with a mineral powder, such as kaolin, talc, diatomaceous earth, activated clay, silicon sand, bentonite, zeolite and attapulgite clay, and subsequently with a liquid chosen from phosphoric acid, sulphuric acid, and nitric acid.

U.S. Pat. No. 3,419,379 A (Goodale et al., 1968) shows a water-resistant coating for ammonium nitrate ($NH_4NO_3$) granules in which the granules were first coated with an acidic super phosphoric acid ($H_3PO_4$) or oleum. The wet granules were then contacted with basic materials such as $NH_3$, MgO, or CaO with an equimolar ratio. The reaction product of the acid with the basic material produced a coating around the granules which prevented them from caking and retarded their dissolution on contact with moist soil. Since an equimolar ratio is used, the basic materials are reacted away with the strong acid to produce a sealing salt layer, consisting of, for instance, calcium sulphate, calcium phosphate, magnesium sulphate, etc. None of the coatings disclosed comprise micronutrients.

WO 99/15480 A1 (Norsk Hydro, 1997) relates to a method for coating particulated fertilizers like complex nitrogen-, phosphorus- and potassium fertilizer (NPK), nitrogen- and potassium type fertilizer (NK), ammonium nitrate fertilizer (AN), calcium nitrate fertilizer (CN) or urea to reduce dust formation and caking during handling and storage. There is no reference to any physical blends. The method comprises applying an aqueous solution of a mineral acid, such as phosphoric acid, sulphuric acid, nitric acid or citric acid and a mineral base, such as magnesium oxide, calcium oxide, barium oxide, dolomite or a mixture of two or more. Said combined treatment is performed only once to form a nutrient containing shell of a metal salt or mixture of metal salts on the particulate fertilizer. The ratio between said acid and said base applied onto the particulated fertilizers is between 1.0 to 1.5 weight/weight. Such a process would not result in a coating suitable for making fertilizer blends.

U.S. Pat. No. 6,030,659 A (Whitehurst B. M. et al.) discloses a method for coating urea particles with major amounts of apatite material in order to reduce the loss of nitrogen through volatilization, while also providing a source of phosphorous, comprising wetting the particles with water or another aqueous material, preferably containing a small amount of an acid, to adjust the pH of the aqueous material to 2 or less. Examples disclose the use of 75% (54% $P_2O_5$) or 62% (45% $P_2O_5$) of phosphoric acid. Although the water content is not mentioned, such composition is not suitable as water seems to be necessary to provide for the binding between the apatite material and the urea-particle. Furthermore, the method is directed to mixing large amounts of phosphate material (apatite) with urea in the order of 30 weight % or more. The problem of adding micronutrients to urea is not disclosed.

CH 425 702 A (Düngemittel-Technik AG, Basel) discloses a method to produce urea-based particles, wherein said particles are wetted using subsequently a polyacrylic acid solution and a waterglass solution, after which the particles are treated with concentrated sulphuric acid and coated with CaO. The importance of a low water concentration in the coating or the urea-based particle is not disclosed.

These different drawbacks, such as delayed release or dilution of the nutrient content without bringing fertilizing properties, have been overcome in the co-pending PCT patent application no. PCT/EP2013/067799, describing a method of producing passivated urea or urea-based compounds for fertilizer blends, wherein the urea particles are first treated with a mineral acid that reacts with urea and creates a grasping layer, and then a solid base in powder form is applied in excess to the particles to coat the acidified particle surface.

The inventors have now realised that this method is also suitable to incorporate micronutrients into an outer shell of urea-based particles, in particular to urea-based particles for use as a fertilizer. As a consequence, the urea-based particles are both better blendable with other particles, and they contain the necessary micronutrients for the plant.

Plants may obtain macronutrients, micronutrients or any combination thereof, amongst others, by the application of particulate fertilizers. Macronutrients are typically divided into primary nutrients (nitrogen, phosphorus and potassium) and secondary nutrients (calcium, magnesium, and sulphur). Micronutrients (also referred to as trace elements) include boron, chlorine, copper, iron, manganese, molybdenum and zinc.

Therefore, the present invention is directed to a method of incorporating said micronutrients in the outer shell of urea-based particles. As an extension of the method according to the invention, also small amounts of primary nutrients (nitrogen, phosphor) and secondary nutrients (calcium, magnesium, and sulphur) may be incorporated into the outer shell of urea-based particles, for example Ca, as part of colemanite, or S as part of sulphuric acid. However, the main object of the present invention is the incorporation of micronutrients in the outer shell of urea-based particles.

At present, there exist different possibilities to provide particulate fertilizers with micronutrients.

A first possibility is to add micronutrients into the fertilizer during the manufacturing process of the fertilizer particles, for instance before the fertilizer particles are formed. The disadvantage of this possibility is that some reactions between the applied micronutrient components and the acids or other materials present may render some of the micronutrients unusable. When for instance zinc oxide (ZnO)

comes into contact with phosphoric acid ($H_3PO_4$), insoluble $Zn_3(PO4)_2$ is formed rendering the micronutrients unusable.

A second possibility is to coat the micronutrients on the fertilizer particles using a non-aqueous solution of the micronutrients, for instance an oil-based solution to which magnesium oxide ($MgO_2$), zinc oxide (ZnO), boric oxide ($B_2O_3$), another mineral base or any combination thereof is applied. However, the addition of oil to the particulate fertilizer results in dilution of the fertilizer. The fertilizer particles furthermore become sticky and having a reduced flowability.

A third possibility is to physically blend the fertilizer particles with specific particles of micronutrients. In that case, a blend is obtained having particles with a different size, resulting in segregation of the particles. When spraying such a blend on the particles, a non-uniform distribution of the added nutrients is obtained.

OBJECT OF THE INVENTION

None of the above methods gives satisfactory results. Therefore, there exists a need to provide an ameliorated method for incorporating micronutrients in the outer shell of a urea-based fertilizer, solving the aforementioned problems.

SUMMARY OF THE INVENTION

According to a first aspect of the invention, a method is disclosed for incorporating micronutrients in an outer shell of urea-based particles, the method comprising the steps of:
  a) applying a liquid concentrated mineral acid with a water content of at most 25 weight % to urea-based particles having a water content of at most 2 weight %, in order to at least form a double salt layer at the outer surface of the urea-based particles such that an acidified particle grasping layer is obtained, and subsequently
  b) applying a solid mineral base in powder form to the urea-based particles of step a) in order to react with the grasping layer of the urea-based particles;

wherein the mineral acid or the solid mineral base are the source of any one of the micronutrients and wherein the liquid concentrated mineral acid and the solid mineral base in powder form are applied in a non-equimolar ratio between 0.1 and 1 mol/mol mineral acid/mineral base.

Within the context of this application, a liquid concentrated mineral acid is a non-organic acid or any mixture thereof. Sulphuric acid, nitric acid, hydrochloric acid and phosphoric acids are probably the most important commercial available concentrated mineral acids, though they are certainly not the only concentrated mineral acids within the context of this application. A mixture may contain any combination of concentrated mineral acids, with the proviso that the mixture has a water content of at most 25 weight % (based on the total weight of the mixture).

Within the context of this application, "concentrated" means having at most a water content of 25 weight %, either at STP (for example in a bottle or drum) or at any other combination of pressure and temperature. Concentrated mineral acids may be provided that have a lower water content at conditions deviating from STP, in particular at higher temperatures, or lower pressure. Some examples of commercially available mineral acids with different concentrations are shown in Table 1.

TABLE 1

Some mineral acids and their purity

| Name | Formula | Commercial concentrations (weight %) | Micronutrient |
|---|---|---|---|
| Boric acid | $H_3BO_3$ | 20% | B |
| Hydrochloric acid | HCl | 32%, 36% | Cl |
| Hydrofluoric acid | HF | 50%, 60%, 70% | none |
| Nitric acid | $HNO_3$ | 60% | none |
| Phosphoric acid | $H_3PO_4$ | 85% (61.6% $P_2O_5$) 75% (54% $P_2O_5$) 62% (45% $P_2O_5$) | none |
| Sulphuric acid | $H_2SO_4$ | 96% | none |

The amount of water (or the relative lack of it) was found crucial to the invention. Too much water (more than 25 weight % in the acid, or more than 2 weight % in the urea-based particle) produced a muddy particle and no effective grasping layer could be formed.

More preferably, said water content of the liquid concentrated mineral acid is less than 25%, still more preferably less than 20%, even more preferably less than 15%, even more preferably less than 10%, even more preferably less than 5%, and even more preferably less than 4%, 3%, 2% or 1%. All percentages are calculated relative to the total weight of the mineral acid.

The concentrated mineral acid is preferably selected from concentrated sulphuric acid, concentrated phosphoric acid and concentrated nitric acid. Most preferably, sulphuric acid is selected as the liquid concentrated mineral acid.

Most preferably, commercially available phosphoric acid (85 weight %) and sulphuric acid (96 weight %) are selected as the liquid concentrated mineral acids.

In a preferred method according to the invention, the liquid concentrated mineral acid and the solid mineral base in powder form are applied in a non-equimolar ratio between 0.1 and 1 mol/mol mineral acid/mineral base.

In another preferred method according to the invention, the liquid concentrated mineral acid and the solid mineral base in powder form are applied in any non-equimolar ratio between 0.1 and 1 mol/mol, wherein the begin and the end of said range may be selected, independently from each other from 0.2, 0.3, 0.4, 0.5, 0.6, 0.7, 0.8 and 0.9 mol/mol, with the proviso that the range is at least 0.1 mol/mol wide. Preferably, said ratio is between 0.1 and 0,5 mol/mol mineral acid/mineral base.

Preferably, the urea-based particles should contain a very low amount of water, or at least an amount which is less than 2, 1.5, 1, 0.9, 0.8, 0.7, 0.6, 0.5, 0.4, 0.3, 0.2, 0.1 weight % or less, relative to the weight of the urea-based particle.

Preferably, less than 2 weight % of solid mineral acid, based on the weight of the urea-based fertilizer particles, are applied to the urea-based fertilizer particles.

Preferably, between 2 and 6 weight % of solid mineral base, based on the weight of the urea-based particles, are applied to the particles of step a).

More preferably, between 0.1 and 2.0 weight % of liquid concentrated mineral acid and between 2 and 6 weight % of solid mineral base, based on the weight of the urea-based particles, are applied to the particles of steps a) and b).

Still more preferably, between 0.9 and 1.0 weight % of liquid concentrated mineral acid and between 2.5 and 4.0 weight % of solid mineral base, based on the weight of the urea-based particles, are applied to the particles of steps a) and b).

Most preferably, between 0.2 and 0.8 weight % of liquid concentrated mineral acid and between 3 and 5.8 weight % of solid mineral base, based on the weight of the urea-based particles are applied to the particles of steps a) and b).

In a favourable method according to the invention, the method comprises the step of post-acidifying the particles obtained in step b).

The solid mineral base in powder form is preferably selected from the oxides, hydroxides or carbonates of the micronutrients, which micronutrients include at least boron, chlorine, copper, iron, manganese, molybdenum and zinc.

According to a second aspect of the invention, a particulate urea-based fertilizer is obtained, comprising urea-based particles having micronutrients in its outer shell, the urea-based particles being obtained by a method according to the invention.

DETAILED DESCRIPTION OF THE INVENTION

The invention concerns a method for incorporating micronutrients into the outer shell of urea-based particles, more specifically of a particulated urea-based fertilizer. In this method, a liquid concentrated mineral acid having a water content of less than 25%, as well as an excess (relative to the acid) of a solid mineral base in powder from are applied to the urea-based particles. The concentrated mineral acid and the solid mineral base in powder form provide for any of the micronutrients. Examples thereof can be found in Table II below.

Preferably, the liquid concentrated mineral acid and the solid mineral base in powder form is applied in a non-equimolar ratio between 0.1 and 1 mol/mol mineral acid/mineral base.

Preferably, less than 2 weight % of solid mineral acid and between 2 and 6 weight % of solid mineral base, based on the weight of the urea-based particles, is applied. More preferably, between 0.1 to 2.0 weight % of liquid concentrated mineral acid and 2 to 6 weight % solid mineral base, based on the weight of the urea-based particles, is applied. Still more preferably, between 0.9 to 1.0 weight liquid concentrated mineral acid and 2.5 to 4.0 weight % solid mineral base, based on the weight of the urea-based particles, is applied. Most preferably, between 0.2 to 0.8 weight % liquid concentrated mineral acid and 3 to 5.8 weight solid mineral base, based on the weight of the urea-based particles is applied.

The application of the concentrated mineral acid and the excess of solid mineral base in powder form can be performed simultaneously in a device, suitable for coating urea-based particles, such as a drum or the like. It is however preferred to first apply the liquid concentrated mineral acid (step a), and thereafter applying the excess of solid mineral base in powder form (step b) to the urea-based particles. Most preferably, after the application of the solid mineral base, again liquid concentrated mineral acid is applied. The concentrated mineral acid is preferably sprayed onto the urea-based particles. The ratio between the mineral acid and the mineral base applied onto the particulated fertilizers is preferably between 0.1 to 1 mol/mol mineral acid/mineral base.

The concentrated mineral acid may be selected from concentrated sulphuric acid ($H_2SO_4$), concentrated phosphoric acid ($H_3PO_4$) and concentrated nitric acid ($HNO_3$). Preferably, concentrated sulphuric acid ($H_2SO_4$) is selected.

The solid mineral base in powder form is preferably selected from the oxides, hydroxides or carbonates of micronutrients. Examples thereof include boric oxide ($B_2O_3$), zinc oxide (ZnO), copper oxide (CuO), copper carbonate ($CuCO_3$), manganese(II)oxide (MnO), manganese dioxide ($MnO_2$), and colemanite ($CaB_3O_4(OH)_3.H_2O$).

The method according to the invention is applicable to any kind of particulated urea-based fertilizer. Examples of thereof are particulated urea fertilizers and particulated urea ammonium sulphate (UAS) fertilizers.

When urea-based particulated fertilizers are treated by the method according to the invention, the concentrated mineral acid reacts with the urea forming a double salt grasping layer on at least part of the outer surface of the fertilizer particles. This grasping layer is a double salt layer onto which further particles can be attached. When adding the excess of solid mineral base in powder form, the particles of the solid mineral base attach to this grasping layer. Contrary to some prior art, It is important to realize that the solid mineral base in powder form is not reacted away with the concentrated acid, but is "glued" to the urea-based particles by the grasping layer, such that the original chemical form (oxide, carbonate, etc.) of the solid mineral base in powder form is substantially preserved, and available for the plants to take up.

Process

The core of the process is to use a system where synthesis of the outer shell according to the invention (passivation layer) can be performed with sufficient homogeneity. Typically, a coating drum, or a rotating blender, or a pan, i.e. standard techniques, are used in the fertilizer industry. A cement truck, with its rotating section, can be perfect for the purpose, used as mobile blending unit. In the rest of the text, the term "drum" is indifferently used for this section of the process, but not limited to. For example, all tests performed to develop this invention were actually performed at a small scale, using a concrete mixer of about 50 L.

Pre-treatment and post-treatment before and after the drum can be used, depending on the actual conditions, quality of materials available, targeted quality of the final product, etc. For example if the urea with the outer shell according to the invention ("passivated urea") is to be transported/stored after the passivation, addition of water-repellent coating can be of interest, to maintain the quality of the product until its final use. Addition of such a coating is a standard process step in fertilizer industry. It is as such not core of this invention but brings further quality to the product.

The production process can be performed as a batch process, or continuously.

In an advantageous embodiment of a method according to the invention, the concentrated mineral acid is sprayed onto the urea-based particles.

EXAMPLES

Drying is of specific interest, especially not only to remove water from the raw materials or absorbed during the processing, but also because the reaction of the acid with the base powder does produce water. Just to illustrate with an example:

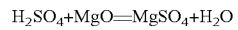

If a dedusting step is performed, typically by the use of air, then this air is cleaned with standard techniques, preferably using dry techniques such as cyclones, electrofilters or bag filters for example, allowing a direct recycling of the dust back to the drum for reprocessing. In case of wet scrubbing, for example, then process integration with e.g.

NPK plant can be optimized, or production of a liquid fertilizer using the scrubbing liquor.

The particles can optionally be coated by a standard coating, before they are blended with other compounds in a final step.

Screening to calibrate the product and remove fines/oversize/lumps due to e.g. progressive scaling of the equipment, can also naturally be performed either as pre or post treatment or both.

Testing

It was first studied/observed that the blending of standard quality urea granules together with standard quality ammonium nitrate or CAN was sometimes possible, provided that the product was dry from the beginning, bagged to avoid any moisture pick up, and stored at ambient temperature. To simulate tougher conditions, a specific laboratory test was developed. In particular higher temperatures typically encountered locally due to sun radiations when the bags are stored outside or even in some warehouses, where the temperature can rise significantly. A generally accepted temperature to simulate such storage conditions is 50° C., that is typically used when performing e.g. safety tests on the thermocycling of AN products. Therefore, to evaluate the performance of the products tested during the development of this invention, a so-called jar test was implemented. The jar test is as follow: in a glass container of 1000 mL, 150 g of urea-based compound in a granular form is blended with an equivalent amount of the other compound, e.g. ammonium nitrate granules, sealed hermetically and stored during 24 hours at 50° C. Since the recipient is in glass, it is easy to observe the behaviour and the evolution of the product inside. This test is stringent, since the product has to withstand for 24 hours a temperature that is rarely reached under most climates, and especially for such a long period of time.

Results from the jar test are simple:
When the products are well blendable, they keep their aspect, remaining nicely free flowing.
On the opposite, when products are not blendable, such as urea with ammonium nitrate, then a large amount of liquid phase is generated, and remaining undissolved granules are visible within this liquid phase. When the temperature is cooling down, the whole crystallizes together.
In between, different situations exist: for example some few granules get half agglomerated half molten together (typically if e.g. one urea granule was present without being passivated as per invention), i.e. a local phenomenon not influencing the rest. Or a global phenomenon, when e.g. the granules are getting sticky and muddy.

Second phase of the development was performed at a pilot scale per batch process, using a concrete mixer of ~50 L volume for both passivation and coating when needed, and a small fluidized bed cooler of 1 m² for dedusting. The invention will be further illustrated by the following examples:

All solid blends of two compounds described in the examples below were performed on a 50/50 basis, expressed in mass. AN (ammonium nitrate) was AN33,5 stabilized with magnesium nitrate, except specified otherwise.

Example 1

Standard products were mixed together in a jar and exposed to a step by step temperature increase.

Two blends were prepared in the jar test, the first was urea granules blended with CAN stabilized with aluminium sulphate and the second CAN stabilized with magnesium nitrate.

After being exposed to 30° C. for 24 hours, both blends remained correct. At 40° C., the blend with CAN stabilized with aluminium sulphate started to turn wet and liquefy, while the other one remained in perfect state. At 50° C., both blends turned totally into slurries.

Example 2

In the laboratory, urea granules were submerged into a beaker full of concentrated sulphuric acid (96% wt) at ambient temperature and stirred for 10 to 20 seconds to ensure a good contact of the urea surface and the acid without dissolving the granules into the liquid.

Granules were then extracted and placed on a Büchner filter for a first removal of the excess of acid, whereafter paper was used to further dry the samples until a constant weight was reached. The acidified granules had a pH of 2.6. The amount of ammonium ions, NH4+, was checked and found to be 40 ppm only, indicating that no urea was decomposed during the treatment, that would have shown presence of ammonium ions (in the form of ammonium sulphate).

The surface of these granules was then treated with magnesium oxide powder, excess magnesium oxide powder being removed by sieving. In that way the pH of the acidified granules was raised from 2.6 to more than 10. The chemical analysis of the product indicates that it contained 0.85% sulphuric acid equivalent and 2.8% magnesium oxide equivalent.

The resultant product was blended with AN, and passed successfully the jar test.

Variations of the previous tests were performed, using respectively phosphoric acid (fertilizer grade, 54% $P_2O_5$) and magnesium oxide, but also sulphuric acid with dolomite, and leading to similar successful results. Further tests were then performed at larger scale, using sulphuric acid and magnesium oxide as reference.

Example 3

In a concrete mixer of about 50 l volume, 20 kg of urea granules were placed. A target amount of sulphuric acid was dropped onto the rolling granules, which requires about 5 minutes. The product was then rotated further for 5 minutes in order to promote a good uniform acid distribution. A target amount of magnesium oxide powder was added using a small vibrating feeder, and the product was rotated for another 5 minutes to get a uniform spreading of the powder, well visible on the white surface of the urea granules. Part of the product could be sampled as such, and part was further dedusted in a fluidized bed cooler for 4 minutes. Air in the fluidized bed cooler is dry (dew point of 5° C.) and warm (35° C.), to dedust the product. No drying effect, or very minor, was observed in the fluidized bed under such conditions.

The amount of respectively equivalent acid and equivalent magnesium oxide in the final product was checked. The amount of acid was always very close to the dosed amount, but the amount of powder was ranging from 60 to 90% of the dosed amount. All the figures mentioned in the examples correspond to the dosed amounts, except specified otherwise.

Example 4

Following this procedure for concrete mixture testing, different mixtures were tested:
  1% sulphuric acid with 2% of magnesium oxide. The product failed in the jar test.
  1% sulphuric acid with 4% of magnesium oxide. The product passed successfully the jar test.
  0.5% sulphuric acid with 4% of magnesium oxide. The product failed in the jar test.
  0.5% sulphuric acid with 6% of magnesium oxide. The product passed successfully the jar test.
  0.2% sulphuric acid with 4% of magnesium oxide. The product nearly passed the jar test.
  0.2% sulphuric acid with 6% of magnesium oxide. The product passed the jar test.

Example 5

Alternative tests were performed to fine-tune the technique.

6% of powder was added first, and thereafter 0.2% of acid. The product was analysed and contained only 2.3% of powder and 0.15% of acid. The product failed in the jar test. It is however remarkable that most acid could be analysed on the granules. The yield of powder fixation was however very low.

4% of powder was added first, and thereafter 1% of acid. The product failed however in the jar test.

Acid was tested in a split application: 0.5% sulphuric acid first, then 4% magnesium oxide, then 0.5% again. The product passed the jar test.

These example show clearly that a first addition of acid is necessary, to act as a grasping layer for the powder, but also to perform a uniform passivation of the surface, mandatory for proper blending with ammonium nitrate.

Post-application, e.g. of acid, is of course possible and can be part of production adjustments in an industrial unit.

Example 6

Tests were performed to evaluate the dustiness of the products.

Dustiness is defined in ppm as the amount of weight loss after fluidizing the product in a standardized procedure for 2 minutes. Figures below 300 ppm lead to a virtually non-dusty product during handling, while products with more than 1000 ppm will be dusty during handling. Standard urea granules typically range between 100 and 1000 ppm of dustiness level by this technique.

Before dedusting step in the pilot plant, i.e. product sampled just after the concrete mixer, figures were high ranging from 2500 to 10000 ppm if using 0.2% acid only. The highest figures are due to small lumps of dust that totally disintegrate in the dust test. When using 1% of acid, figures were as well in the range 2000 to 3000 ppm. Lowest figures before any dedusting were obtained with pre and post addition of acid. Tests with 0.5% of acid, then 4% of powder, then 0.5% of acid, gave figures of 1000 ppm.

After the dedusting step in the pilot plant, figures were typically 800 to 1200 ppm dust if using 0.2% acid only versus less than 500 ppm when 1% of acid was used.

Moreover, after addition of a coating oil as it is standard in fertilizer industry, the dustiness could be further reduced. In any case, coating of the product with a water-repellent coating is advisable to limit any moisture pick up and moisture transfer during handling prior and after blending.

From those tests, it shows that adding acid in two steps can be a good way to limit the dustiness of the product, which is of special interest for a batch process. However, if a dedusting step is foreseen in the process, there were no differences between products where 1% of acid was directly added or when it was added in two times 0.5%.

Example 7

Moisture Transfer

All urea passivated in the concrete mixer obtained a significant moisture increase during the test, in particular due to the hygroscopicity of the concentrated sulphuric acid.

The moisture train was analysed by Karl Fisher method:
  Urea before any treatment: 0.36% water.
  Urea sampled in the concrete mixer after addition of sulphuric acid 96%: 0.58% water, due to moisture pick up from the surrounding environment.
  Urea sampled after addition of 4% MgO: 0.72% water (since the reaction between sulphuric acid and magnesium oxide releases 1 mol of water).
  Urea sampled after the fluidized bed dust removal (4minutes at 35° C.): 0.7% water.
  Final sample, kept at 50° C. over the week end: 0.6% water.
  Urea sampled after the fluidized bed dust removal (4 minutes at 65° C.): 0.54% water.
  Final sample, dried by infrared at 100° C.: 0.16% water.

This moisture train shows that most water can be easily removed in an industrial process. First of all by preventing moisture pick up during the application of the acid, second by including a drying step at gentle temperature in the process, typically between 50 and 100° C.

In any case, despite the relatively high water content of the samples produced in our testing, the tests with AN were successful as described above. To be dryer means only to build extra robustness in the product.

Example 8

In order to evaluate the moisture transfer potential from such passivated urea into the AN during the blend, a sample of 20 g of passivated urea was placed in a cup in a desiccator filled with 200 grams of AN, and kept overnight.

If it was kept at ambient temperature, the water content of the passivated urea decreased from 0.68% down to 0.52%. If it was kept at 50° C., the water content of the passivated urea decreased from 0.68% down to 0.46%.

It is therefore crucial that either the AN compound has some water binding capacity, or that the passivated urea is sufficiently dry. This can be done either to prevent any moisture pick up during its production and even better, to include a drying step. In our tests, the AN 33.5 was stabilized with 2.3% magnesium nitrate and contain typically ~0.5-0.8% before blending. The test failed if the AN contained 1.3% of water from the start, which correspond to the limit of no free water at 50° C.

Example 9

Some extra tests were performed to check the potential of the invention for other blends.

Urea was blended with TSP granules containing 1% of water analysed by Karl Fisher (KF). The blend could not pass the jar test.

Urea passivated with 1% acid and 4% magnesium oxide was blended with the same TSP. It passed successfully the jar test.

UAS was passivated with 1% of sulphuric acid and 4% of magnesium oxide, and blended with calcium nitrate granules. The blend passed the jar test.

Example 10

In the Table II below, a number of possible combinations of liquid concentrated mineral acids having a water content of less than 25% and solid mineral base materials in powder form are shown, wherein these liquid concentrated mineral acids and the solid mineral base materials in powder form are a possible source for any of the macro- and micronutrients.

TABLE 2

Combinations of mineral acids and solid mineral base in powder form

| Mineral acid | Typical $H_2O$ conc. (weight %) | Mineral base in powder form | Primary macro-nutrient | Secondary macro-nutrient | Micro-nutrient |
|---|---|---|---|---|---|
| Sulphuric acid | <5 | Manganese dioxide | — | S | Mn |
| Phosphoric acid | 20-25 | Manganese dioxide | P | — | Mn |
| Sulphuric acid | <5 | Zinc oxide | — | S | Zn |
| Sulphuric acid | <5 | Zinc oxide Magnesium oxide | — | S, Mg | Zn |
| Sulphuric acid | <5 | Copper oxide | — | S | Cu |
| Sulphuric acid/ Boric acid | 25 | Zinc oxide | — | S | B, Zn |
| Sulphuric acid Nitric acid | <25 | Manganese dioxide | N | S | Mn |

In this invention, we are working with low ratios acid to base. As demonstrated by the examples, this passivation process is not working with a constant, nor fixed ratio of acid to base. The less acid that is added, the more base is required to compensate. Preferably, a large excess of base material is used.

The invention claimed is:

1. A method for incorporating at least one micronutrient in an outer shell of urea-based particles, said method comprising the steps of:
   a) applying less than 2 weight % of a liquid concentrated mineral acid, relative to the weight of the urea-based particles, to urea-based particles having a water content of at the most 2 weight %, wherein the liquid concentrated mineral acid has a water content of at most 25 weight %, relative to the weight of the urea-based particles, and wherein the liquid concentrated mineral acid reacts with the urea in order to form at least a double salt layer on at least part of the outer surface of the urea-based particles such that an acidified particle grasping layer is obtained,
   and subsequently
   b) applying between 2 and 6 weight % of a solid mineral base in powder form, based on the weight of the urea-based particles, to the urea-based particles of step a) in order to attach the solid mineral base in powder form to the grasping layer of the urea-based particles;
   wherein at least one of the mineral acid and the solid mineral base comprises at least one micronutrient,
   wherein the outer shell comprises the acidified particle grasping layer with the solid mineral base in powder form attached thereto, and
   wherein the liquid concentrated mineral acid and the solid mineral base in powder form are applied in a non-equimolar ratio between 0.1 and 1 mol/mol mineral acid/mineral base.

2. The method according to claim 1, wherein the water content of the liquid concentrated mineral acid is less than 25%.

3. The method according to claim 1, wherein the liquid concentrated mineral acid is sulphuric acid.

4. The method according to claim 1, wherein the liquid concentrated mineral acid and the solid mineral base in powder form are applied in a non-equimolar ratio between 0.1 and 0.5 mol/mol mineral acid/mineral base.

5. The method according to claim 1, wherein the urea-based particles contain an amount of water which is less than 2 weight % or less, relative to the weight of the urea-based particles.

6. The method according to claim 1, wherein between 0.1 and 2.0 weight % of liquid concentrated mineral acid and between 2 and 6weight % of solid mineral base in powder form, based on the weight of the urea-based particles, are applied to the particles of steps a) and b).

7. The method according to claim 1, wherein between 0.9 and 1.0 weight % of liquid concentrated mineral acid and between 2.5 and 4.0weight % of solid mineral base in powder form, based on the weight of the urea-based particles, are applied to the particles of steps a) and b).

8. The method according to claim 1, wherein between 0.2 and 0.8 weight % of liquid concentrated mineral acid and between 3 and 5.8weight % of solid mineral base, in powder form based on the weight of the urea-based particles are applied to the particles of steps a) and b).

9. The method according to claim 1, further comprising the step of post-acidifying the particles obtained in step b).

10. The method according to claim 1, wherein the micronutrients are selected from the group consisting of boron, chlorine, copper, iron, manganese, molybdenum, and zinc.

11. The method according to claim 1, wherein the solid mineral base in powder form is selected from the group consisting of oxides, hydroxides, and carbonates of the micronutrients.

12. The method according to claim 11, wherein the solid mineral base in powder form is selected from the group consisting of boric oxide ($B_2O_3$), zinc oxide (ZnO), copper oxide (CuO), copper carbonate ($CuCO_3$), manganese (II) oxide (MnO), manganese dioxide ($MnO_2$), and colemanite ($CaB_3O_4(OH)_3H_2O$).

13. The method according to claim 1, wherein steps a) and b) are performed simultaneously in a device, and wherein the device is capable of coating urea-based particles.

14. The method according to claim 1, wherein first step a) and subsequently step b) are performed in a device, and wherein the device is capable of coating urea-based particles.

15. The method according to claim 1, wherein the liquid concentrated mineral acid is sprayed onto the urea-based particles.

16. A particulate urea-based fertilizer comprising urea-based particles with a water content of at most 2 weight %, comprising micronutrients in an outer shell, wherein the urea-based particles are obtained by the method according to claim 1.

17. A particulate urea-based fertilizer comprising urea-based particles with a water content of at most 2 weight %, comprising micronutrients in an outer shell, wherein the outer shell comprises:
  a) less than 2 weight % of liquid concentrated mineral acid, relative to the weight of the urea-based particles, said liquid concentrated mineral acid having a water content of at most 25 weight %, reacting with urea in order to form at least a double salt layer on at least a part of the urea-based particles, and
  b) between 2 and 6weight % of solid mineral base in powder form, based on the weight of the urea-based particles, wherein the liquid concentrated mineral acid or the solid mineral base in powder form comprise at least one micronutrient selected from the group consisting of boron, chlorine, copper, iron, manganese, molybdenum, and zinc.

* * * * *